United States Patent [19]
Page

[11] 3,867,179

[45] Feb. 18, 1975

[54] COATED POLYMERIC FIBERS

[76] Inventor: William H. Page, 1830 Palisades Dr., Appleton, Wis. 54911

[22] Filed: Apr. 9, 1973

[21] Appl. No.: 349,508

Related U.S. Application Data

[63] Continuation-in-part of Ser. No. 295,620, Oct. 6, 1972, abandoned.

[52] U.S. Cl. ............... 117/76 F, 117/138.8 UA, 117/138.8 E, 117/138.8 F, 117/138.8 N, 117/161 UA
[51] Int. Cl. .............................................. B44d 1/16
[58] Field of Search ........ 117/76 F, 76 FB, 138.8 E, 117/138.8 UA, 161 UA, 161 UN; 260/80.3 R

[56] References Cited
UNITED STATES PATENTS

| | | | |
|---|---|---|---|
| 3,037,006 | 5/1962 | Hankins et al. | 260/80.5 |
| 3,345,196 | 10/1967 | Goldbeck | 117/11 |
| 3,493,420 | 2/1970 | Brintzinger et al. | 117/76 |
| 3,499,820 | 3/1970 | Desaulniers | 161/162 |
| 3,502,627 | 3/1970 | Dupont | 260/86.1 |
| 3,508,960 | 4/1970 | Gagliardi et al. | 117/140 |
| 3,549,404 | 12/1970 | Liberti et al. | 117/26 |
| 3,671,472 | 6/1972 | McNamee et al. | 260/17.4 ST |
| 3,711,433 | 1/1973 | Willey | 260/17 R |

*Primary Examiner*—P. E. Willis, Jr.
*Attorney, Agent, or Firm*—E. Frank McKinney; Robert J. Shafer

[57] ABSTRACT

Sheet of polymeric material coated with a mixture of an amine polymer and a clay material have been invented. The sheets include non-woven webs of polymeric fibers and continuous films of polymeric material. The coating mixture of this invention consists essentially of two coatings, a tie-coat and an overcoat. The tie-coat is sandwiched between the overcoat and the continuous film of polymeric material or the non-woven web of polymeric fiber.

10 Claims, No Drawings

COATED POLYMERIC FIBERS

This is a continuation-in-part of application Ser. No. 295,620, filed Oct. 6, 1972, now abandoned.

This invention relates to sheets of polymeric material coated with a mixture of an amine polymer and a clay material. The sheets include non-woven webs of polymeric fibers and continuous films of polymeric material.

Sheet material of polymeric fibers of infinite length are commercially available. Generally, the fibers are spun out and bonded by heat and pressure into a web which is tear resistant, water resistant and biologically stable. Preferred material is non-woven web material made from spun polyethylene fibers as marketed by E. I. du Pont de Nemours and Company under the trademark TYVEK and a spunbonded nylon material sold by Monsanto Company under the trademark CEREX. Sheets of continuous films of polymeric material are, of course, also available such as that sold by The Dow Chemical Company under the trademark TRYCITE.

For some applications such as for a book covering material, non-woven webs have undesirable surface and print properties as do continuous films of polymeric material. Often, the webs have poor ink receptivity and rough surfaces.

It has now been found that the surface of non-woven webs of polymeric fibers is rendered smooth and ink receptive with a mixture of an amine polymer and a clay material. Continuous polymeric films are rendered more ink receptive by such a mixture. The coated sheets of this invention meet flex, impact, scrub and scuff abuse tests of, for example, the book manufacturing industry. Further, there is excellent bonding between the coating composition and the polymeric material of the fiber or film sheets.

Accordingly, an object of this invention is to provide non-woven webs of polymeric fibers coated with a mixture of an amine polymer and a clay material.

Another object of this invention is to provide continuous films of polymeric material coated with a mixture of an amine polymer and a clay material.

Other objects, aspects and advantages of this invention will be apparent to one skilled in the art from the following disclosure and appended claims.

The coating mixture of this invention consists essentially of two coatings, a tie-coat and an overcoat.

The tie-coat comprises a mixture of an amine polymer and a clay material having a ratio, by weight, of the clay material to the amine polymer ranging up to 1 to 1. The overcoat comprises a mixture of the amine polymer and the clay material having a ratio, by weight, of the clay material to the amine polymer greater than 1 to 1. Preferably, the ratio of the clay material to the amine polymer is about 1 to 1 in the tie-coat and is about 2 to 1 in the overcoat.

The clay material employed in this invention includes a great variety of aluminum silicate-bearing compositions, which are plastic when wet and hardened when fired. The major proportion of typical clays are made up of kaolinite, halloysite, montmorillonite and illite. Clay usually contains other minerals such as quartz, calcite, limonite, gypsum, muscovite and the like. Kaolin, generally known and used in the paper industry as "china clay," is preferred because of its unparalleled coating properties in aqueous slurries and its universal abundance in supply.

The amine polymers of this invention are derived from N-acryloxyalkyl-oxazolidines and N-acryloxyalkyl-tetrahydro-1,3-oxazines and the corresponding compounds in with the "alkyl" linkage is replaced by alkoxyalkyl and poly(alkoxy-alkyl), such as those having the formula $$H_2C=C(R)-\overset{O}{\overset{\|}{C}}-A-N\underset{\underset{R^1\quad R^2}{\diagdown C \diagup}}{\overset{\diagup (CH_2)_m \diagdown}{\diagdown\qquad\diagup}}O$$

wherein
R is H or $CH_3$,
m is an integer having a value of 2 to 3,
$R^1$, when not directly joined to $R^2$, is selected from the group consisting of hydrogen, phenyl, benzyl, and ($C_1$–$C_{12}$) alkyl groups,
$R^2$, when not directly joined to $R^1$, is selected from the group consisting of hydrogen and ($C_1$–$C_4$) alkyl groups
$R^1$ and $R^2$, when directly joined together, form a 5- to 6-carbon ring with the attached carbon atom of the ring in the formula, i.e., $R^1$ and $R^2$, when joined together, are selected from the group consisting of pentamethylene and tetramethylene, and A is $-O(CH_2)_m-$ or (O-alkylene)$_n$ in which (O—alkylene)$_n$ is a poly(oxyalkylene) group, having a molecular weight in the range from 88 to 348, in which the individual alkylene radicals are the same or different and are either ethylene or propylene.

Specific examples of these monomers are:
Oxazolidinylethyl methacrylate
Oxazolidinylethyl acrylate
3-(gamma-methacryloxypropyl)-tetrahydro-1,3-oxazine
3-(β-methacryloxyethyl)-2,2-pentamethyleneoxazolidine
3-(β-methacryloxyethyl)-2-methyl-2-propyloxazolidine
N-2(2-acryloxyethoxy)ethyloxazolidine
N-2-(2-methacryloxyethoxy)ethyloxazolidine
N-2-(2-methacryloxyethoxy)ethyl-5-methyloxazolidine
N-2-(2-acryloxyethoxy)ethyl-5-methyloxazolidine
3-[2-(2-methacryloxyethoxy)ethyl)]-2,2-pentamethyleneoxazolidine
3-[2-(2-methacryloxyethoxy)ethyl)]-2-methyl-2-propyloxazolidine
3-[2-(methacryloxyethoxy)ethyl)]-2-phenyloxazolidine.

The monomers hereinabove are polymerized in an emulsion system under acid, neutral or basic conditions so that the monomers may be used in base form or in their salt form, such as may be obtained with any suitable acid including hydrochloric, sulfuric sodium bisulfate, phosphoric acid, sodium bioxalate, formic acid and so on.

Small amounts of other inert materials, detackifiers, defoamers, fillers and the like also can be employed.

Generally, the coating compositions are applied by conventional means from an aqueous solution and dried.

The pigments employed in this invention to color the coatings vary widely. Generally, the pigments are finely divided solid powders which are wettable. Titanium dioxide, zinc oxide, iron oxide, carbon black, red lead, chrome pigments such as chrome yellow, Venetian red, Prussian blue, copper or cobalt blues and the like can be employed. Luminescent and daylight fluorescent pigments have become increasingly important. Other pigments and dyes that can be employed in this invention are listed in *The Chemical Formulary*, Volume II, pp. 252,269, H. Bennett, Editor-in-Chief, D. Van Nostrand Company, Inc., (1935).

The polyolefin fibers employed in the non-woven webs of this invention are polymers derived by the polymerization of relatively simple olefins. Two preferred polymers are polyethylene and polypropylene. Polybutenes also are of importance as are copolymers of ethylene with propylene and butene. Other eligible fibers in non-woven webs include polyamide and polyester materials.

The polymeric material employed in the continuous film sheets of this invention includes polystyrenes, polyvinyl chlorides, polyamides, polyesters, polyacrylates and copolymers, polyvinylacetates, polyvinylidenes, ethylene/acrylic and propylene/acrylic copolymers, acrylic/butadiene/styrene polymers, and the like, polymeric materials used in manufacture of films, sheets or cards.

The advantages of this invention are further illustrated by the following example. The materials, proportions and other specific conditions are presented as being typical and should not be construed to limit the invention unduly.

EXAMPLE I

Sheet material of a non-woven web of polyethylene fibers was coated with tie-coating of an aqueous solution of a polymer of oxazolidinylethyl methacrylate containing, by weight, an amount of kaolin clay almost equal to the amount of methacrylate and containing about one-third, by weight, water. The coating was dried and an overcoating of the following formulation was applied:

| Formulation | Dry Weight, grams |
| --- | --- |
| Kaolin | 37 |
| CaCO$_3$ | 22 |
| TiO$_2$ | 14 |
| starch | 3 |
| $^1$oxazolidinylethyl methacrylate polymer | 24 |
| | 100 |

$^1$The oxazolidinylethyl methacrylate polymer is described in U.S. Pat. No. 3,671,472 and is, for example, sold as a 50 weight percent aqueous latex emulsion by Rohm and Haas Company, Philadelphia, Pennsylvania under the trademark "E-557."

The overcoat was applied from an aqueous solution containing, about 50 percent by weight solids, a small amount of octanol (defoamer) and a small amount of ammonia. The methacrylate polymer employed is a modified-acrylic polymer which has the ability to crosslink with kaolin clay. The crosslinking occurs as the coating dries and the pH drops below 8 due to evaporation of the volatile ammonium hydroxide.

This formulation mitigates against blocking as well as improving abrasion, crinkle, and tumble resistance. The small amount of starch releases blocking and detackifies without effectively harming the desirable characteristics of the coating composition. The use of the methacrylate polymer, with its excellent ink receptivity, and its ability to bond to a relatively high percentage of clay makes for superior printability and press performance.

EXAMPLE II

Two other non-inventive runs were carried out in essentially the same manner as Example I except that non-inventive styrene-butadiene rubber (SBR), and a non-inventive acrylic polymer were employed in place of the methacrylate polymer of this invention.

Even with the maximum possible overcoat filler content consistent with the wear requirements of book covering material, SBR still tended to be marginally ink repellent and required skill on the offset press operator's part to hold the metering rate of the dampening (fountain) solution low enough to insure ink transfer without getting into scumming problems caused by the plate becoming so dry it would start to pick up ink in the non-image areas.

The non-inventive acrylic polymer was borderline for resistance to blocking when shipped in cartons piled on a skid or in sheet form without cartons, where its own weight tends to cause the resin to contact and stick to other surfaces.

EXAMPLE III

Sheet material of a continuous polystyrene film was coated with a tie-coating of about 16 percent, by weight, titanium dioxide pigment (such as the pigment sold by E. I. du Pont de Nemours under the tradename of "TiPure L.W."), about 23 percent, by weight, of oxazolidinylethyl methacrylate polymer (above-identified as in Example I), and about 60 percent, by weight, water. The remaining 1 percent, by weight, included a small amount of octanol as a defoamer and ammonium hydroxide to maintain a basic pH.

The polystyrene sheet material had a thickness of about 3 mils and was of the oriented variety such as that sold by Dow Chemical Company, Midland, Mich., under the trademark TRYCITE. The tie-coat was applied by conventional methods in an amount of about 4 to 6 wet pounds per 3,300 square feet ream and was dried to less than about 5 percent or less, by weight, moisture. The tie-coat represents an essential and critical feature of the present invention in tenaciously adhering to the plastic film substrate and providing an anchor for whatever functional topcoating might be desired or required. An example of such topcoating can comprise about 36 weight percent pigment (for instance 2:1, by weight, titanium dioxide to kaolin clay), about 16 weight percent polymeric binder (for instance acrylate copolymers from a latex formulation) and about 48 weight percent water.

EXAMPLE IV

Polyvinyl chloride card material about 0.011 inches thick was coated by a tie-coat formulation similar to that of Example III with the exception that the titanium dioxide pigment was replaced by kaolin clay. The tie-coat was applied in areas on the cards where magnetic top coating was desired. The magnetic top coating formulation subsequently applied could comprise about 29.3 weight percent magnetic iron oxide pigment (Fe$_2$O$_3$), about 5.7 weight percent styrene polymer latex adhesive, about 58.8 weight percent water, and about 6.2 weight percent various surface active agents and defoamers.

It should be noted that the critical feature of the present invention resides in use of the oxazolidine material in a tie-coating on a plastic substrate to obtain a tenacious foundation for additional coatings wherein said additional coatings are such that they would not adhere to the plastic without such a tie-coat.

When continuous plastic films, such as those of Examples III and IV are coated by top coatings without the oxazolidine, the results are similar to the results described in Example II, above wherein non-woven webs of fibers were so-coated.

Although this invention has been described in considerable detail, it must be understood that such details are for the purpose of illustration only and that many variations and modifications can be made by one skilled in the art without departing from the scope and spirit thereof.

What is claimed is:

1. A sheet of polymeric material coated with two coatings of a mixture of a clay material and a polymer of an oxazolidine represented by the formula

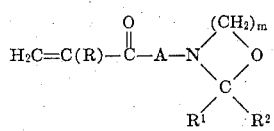

wherein

R is H or $CH_3$, m is an integer having a value of 2 to 3, $R^1$, when not directly joined to $R^2$, is selected from the group consisting of hydrogen, phenyl, benzyl, and ($C_1$-$C_{12}$) alkyl groups, $R^2$, when not directly joined to $R^1$, is selected from the group consisting of hydrogen and ($C_1$-$C_4$) alkyl groups, $R^1$ and $R^2$, when joined together, are selected from the group consisting of pentamethylene and tetramethylene, and A is $-O(CH_2)_m-$ or $(O\text{-alkylene})_n$ in which $(O\text{-alkylene})_n$ is a poly(oxyalkylene) group, having a molecular weight in the range from 88 to 348, in which the individual alkylene radicals are the same or different and are either ethylene or propylene, wherein the mixture is used in a tie-coat, as the first coating, and in an overcoat, as the second coating, wherein the tie-coat has a ratio, by weight, of the clay to the polymer of oxazolidine ranging up to 1 to 1, and wherein the overcoat has a ratio, by weight, of the clay to the polymer of oxazolidine greater than 1 to 1.

2. A sheet according to claim 1 wherein the ratio of the clay to the polymer of oxazolidine in the tie-coat is almost 1 to 1 and wherein the ratio of the clay to the polymer of oxazolidine in the overcoat is about 2 to 1.

3. A sheet according to claim 1 wherein the polymeric material is non-woven.

4. A sheet according to claim 3 wherein the non-woven fibers are selected from the group consisting of polyethylene, polypropylene, polybutene and copolymers of ethylene with propylene and butene.

5. A sheet according to claim 1 wherein the polymeric material is a continuous film.

6. A sheet according to claim 5 wherein the continuous film is selected from the group consisting of polystyrene, polyvinyl chloride, polyacrylates, polyvinyl acetate, polyvinylidenes, and copolymers of acrylates with ethylene, propylene, styrene and butadiene.

7. A sheet according to claim 1 wherein the overcoat contains a small amount of detackifier.

8. A sheet according to claim 7 wherein the detackifier is starch.

9. A sheet according to claim 1 wherein the polymer of oxazolidine is crosslinked with the clay.

10. A sheet according to claim 1 wherein the polymer of oxazolidine is a polymer of oxazolidinylethyl methacrylate and the clay is kaolin.

* * * * *

UNITED STATES PATENT OFFICE
CERTIFICATE OF CORRECTION

PATENT NO. : 3,867,179
DATED : February 18, 1975
INVENTOR(S) : William H. Page

It is certified that error appears in the above-identified patent and that said Letters Patent are hereby corrected as shown below:

On the cover page, after [76] Inventor block, there should be inserted

--[73] Assignee: NCR Corporation
Dayton, Ohio--

Signed and Sealed this second Day of December 1975

[SEAL]

Attest:

RUTH C. MASON
Attesting Officer

C. MARSHALL DANN
Commissioner of Patents and Trademarks